(12) United States Patent
Qiu

(10) Patent No.: US 11,683,870 B2
(45) Date of Patent: Jun. 20, 2023

(54) UNVERSAL DIMMING EMULATOR FOR LED DRIVER

(71) Applicant: Lumileds LLC, San Jose, CA (US)

(72) Inventor: Yifeng Qiu, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 272 days.

(21) Appl. No.: 17/123,483

(22) Filed: Dec. 16, 2020

(65) Prior Publication Data

US 2022/0191988 A1 Jun. 16, 2022

(51) Int. Cl.
*H05B 45/325* (2020.01)
*H05B 47/19* (2020.01)
*H05B 45/10* (2020.01)

(52) U.S. Cl.
CPC ........... *H05B 45/325* (2020.01); *H05B 45/10* (2020.01); *H05B 47/19* (2020.01)

(58) Field of Classification Search
CPC ...... H05B 45/10; H05B 45/20; H05B 45/325; H05B 45/34; H05B 47/19; Y02B 20/30
See application file for complete search history.

(56) References Cited

U.S. PATENT DOCUMENTS

| 9,609,713 | B1 | 3/2017 | Zheng et al. | |
|---|---|---|---|---|
| 9,750,100 | B2 | 8/2017 | Ivey et al. | |
| 2021/0368596 | A1* | 11/2021 | Zou | H05B 45/10 |
| 2022/0094143 | A1* | 3/2022 | Rai | H02G 5/10 |
| 2022/0095431 | A1* | 3/2022 | Archer | H05B 45/355 |
| 2023/0041543 | A1* | 2/2023 | Sun | H05B 45/325 |

FOREIGN PATENT DOCUMENTS

| CN | 208836431 U | 5/2019 |
|---|---|---|
| WO | WO-2018/041687 A1 | 3/2018 |

* cited by examiner

*Primary Examiner* — Raymond R Chai
(74) *Attorney, Agent, or Firm* — Schwegman, Lundberg & Woessner, P.A.

(57) ABSTRACT

Apparatuses and methods are disclosed for controlling a multicolor LED array. The light engine includes a dimming emulator that supplies high and low supply voltages to a driver dependent on a duty cycle of PWM signals from a control unit. An optical coupler isolates the low supply voltage from ground of the dimming emulator. The control unit receives power for the array from the driver dependent on the supply voltages and controls the array based thereon. The coupler is coupled to a control terminal of an NPN transistor, the PWM signals change the average impedance of the coupler based on the duty cycle and change a voltage divider ratio applied to the control terminal. Other apparatuses and methods are disclosed.

18 Claims, 6 Drawing Sheets

UNVERSAL DIMMING EMULATOR FOR LED DRIVER

TECHNICAL FIELD

Some embodiments herein relate to a dimming emulator. Some embodiments herein relate to use of a dimming emulator for a driver used to drive light-emitting diode (LED) arrays. Some embodiments herein relate to use of a dimming emulator that is able to be used with a wide variety of drivers.

BACKGROUND

LED arrays are used in a wide variety of residential and commercial environments. In many such environments, multicolor LED arrays are used to provide a particular color appearance of one or more illuminated subjects, which is determined, in part, by the spectral power density (SPD) of light illuminating the subject. While the SPD is the relative intensity for various wavelengths within the visible light spectrum, other factors can affect the color appearance. In particular, both a correlated color temperature (CCT) of an LED, and a distance of the temperature of the LED on the CCT from a black-body line (BBL, also known as a black-body locus or a Planckian locus), can affect human perception of the color of the subject. Due to the increasing ubiquity of LED lighting, there is a large market demand for lighting solutions using LED arrays, such as in retail and hospitality lighting applications. It is thus desirable to control both the color temperature and brightness level of the LEDs in the LED arrays dependent on the LED environment. A combination of control circuitry to control the LED arrays and driver circuitry to drive the LED arrays may be used to control both the color temperature and brightness level of the LEDs. However, in some circumstances, incompatibilities may exist between control circuitry and the driver circuitry. Accordingly, it may be desirable to mitigate such incompatibilities.

The information described in this section is provided to offer the skilled artisan a context for the following disclosed subject matter and should not be considered as admitted prior art.

DETAILED DESCRIPTION

Figure 1:
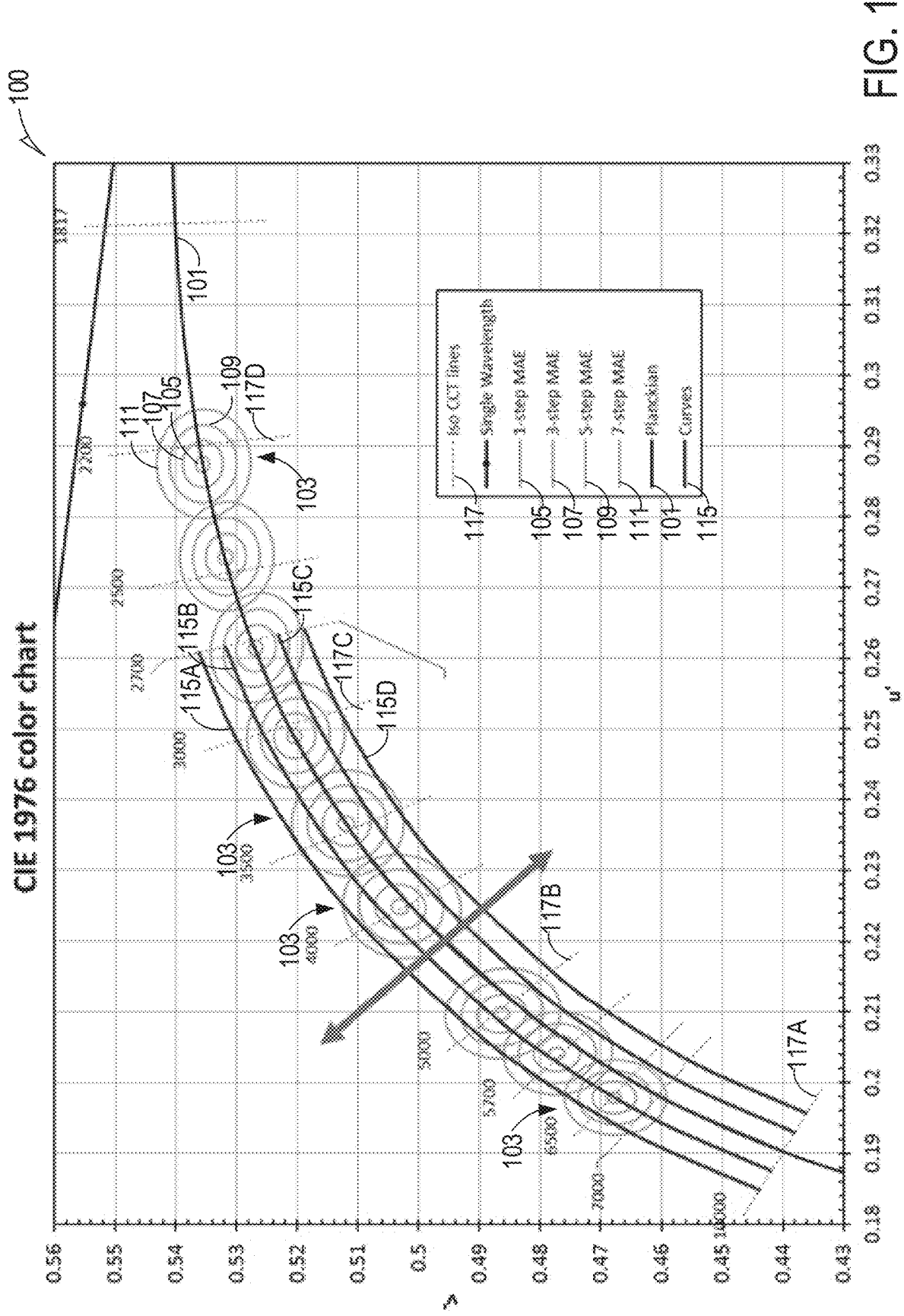
FIG. 1 shows a portion of an International Commission on Illumination (CIE) color chart, including a black body line (BBL)

The disclosed subject matter will now be described in detail with reference to a few general and specific embodiments as illustrated in various ones of the accompanying drawings. In the following description, numerous specific details are set forth in order to provide a thorough understanding of the disclosed subject matter. It will be apparent, however, to one skilled in the art, that the disclosed subject matter may be practiced without some or all of these specific details. In other instances, well-known process steps or structures have not been described in detail so as not to obscure the disclosed subject matter.

Examples of different light illumination systems and/or light-emitting diode implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer generally to like elements throughout.

Further, it will be understood that, although the terms first, second, third, etc. may be used herein to describe various elements. However, these elements should not be limited by these terms. These terms may be used to distinguish one element from another. For example, a first element may be termed a second element and a second element may be termed a first element without departing from the scope of the disclosed subject matter. As used herein, the term "and/or" may include any and all combinations of one or more of the associated listed items.

It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper," "lower," "horizontal," or "vertical" may be used herein to describe a relationship of one element, zone, or region relative to another element, zone, or region as illustrated in the figures. A person of ordinary skill in the art will understand that these terms are intended to encompass different orientations of the device in addition to an orientation depicted in the figures. Further, whether the LEDs, LED arrays, electrical components and/or electronic components are housed on one, two, or more electronics boards, or in one or multiple physical locations may also depend on design constraints and/or a specific application.

Semiconductor-based light-emitting devices or optical power-emitting-devices, such as devices that emit ultraviolet (UV) or infrared (IR) optical power, are among the most efficient light sources currently available. These devices may include light-emitting diodes, resonant-cavity light emitting diodes, vertical-cavity laser diodes, edge-emitting lasers, or the like (simply referred to herein as LEDs). Due to their compact size and low power requirements, LEDs may be attractive candidates for many different applications. For example, they may be used as light sources (e.g., flashlights and camera lighting) for hand-held battery-powered devices, such as cameras and cellular phones. LEDs may also be used, for example, for automotive lighting, heads-up display (HUD) lighting, horticultural lighting, street lighting, a torch for video, general illumination (e.g., home, shop, office and studio lighting, theater/stage lighting, and architectural lighting), augmented reality (AR) lighting, virtual reality (VR) lighting, as back lights for displays, and IR spectroscopy. A single LED may provide light that is less bright than an incandescent light source, and, therefore, multi-junction devices or arrays of LEDs (such as monolithic LED arrays, micro LED arrays, etc.) may be used for applications where enhanced brightness is desired or required.

In various environments where LED-based lamps (or related illumination devices) are used to illuminate objects as well as for general lighting, it may be desirable to control aspects of the color temperature of the LED-based lamps (or a single lamp) in addition to a relative brightness (e.g., luminous flux) of the lamps. Such environments may include, for example, retail locations as well as hospitality locations such as restaurants and the like.

In addition to the CCT, another lamp metric is the color-rendering index (CRI) of the lamp. The CRI is defined by the International Commission on Illumination (CIE) and provides a quantitative measure of an ability of any light source (including LEDs) to accurately represent colors in various objects in comparison with an ideal, or natural-light source. The highest possible CRI value is 100. Another quantitative lamp metric is $D_{uv}$. The $D_{uv}$ is a metric defined in, for example, CIE 1960, to represent the distance of a color point to the BBL. It is a positive value if the color point is above the BBL and a negative value if the color point is below the BBL. Color points above the BBL appear greenish in color and those below the BBL appear pinkish in color. To control both a color temperature (CCT and $D_{uv}$) as well as a brightness level of the lamp, as above, both control circuitry and a driver may be provided to control LED arrays of different colors. As described herein, the color temperature is related to both CCT and $D_{uv}$ in color-tuning applications.

Multiple technologies exist for color tuning (e.g., white tuning) of LEDs. A first technology is based on white LEDs of two or more CCTs and does not have a capability to tune LEDs in the $D_{uv}$ direction. A second technology, which is based on a combination of Red/Green/Blue/Amber colors, may provide a color tuning capability. However, the color tuning capability may seldom be offered as an available function in various applications. In those cases, a color wheel based on either Red-Green-Blue (RGB) or Hue-Saturation-Lightness (HSL) models may instead be offered for an installation. The RGB and HSL models, however, were not designed for general illumination. Instead, both the RGB and HSL model are more appropriate for graphics or photographic applications. Accordingly, it is desirable to offer the ability to color tune LED lighting engines for installation in various embodiments.

An apparatus, such as a lighting engine, may be used for a color-tuning (covering one or both of CCT and $D_{uv}$) scheme for driving various colors of LEDs including, for example, primary color (Red-Green-Blue or RGB) LEDs, or desaturated (pastel) RGB color LEDs, to make light of various color temperatures with a high color-rendering index (CRI) and high efficiency, specifically addressing color mixing using phosphor-converted color LEDs. In some cases, the color-tuning scheme may be wirelessly controlled. Upon reading and understanding the disclosed subject matter, a person of ordinary skill in the art will recognize that a similar scheme can be used for wireless control of luminous flux (e.g., "brightness level") of the LEDs as well.

As the forward voltage of direct color LEDs decreases with increasing dominant wavelength such LEDS can be driven with, for example, multichannel DC-to-DC converters. Advanced phosphor-converted color LEDs, targeting high efficacy and high CRI values, have been created providing for new possibilities for CCT tuning applications. Some of the advanced color LEDs have desaturated color points and can be mixed to achieve white colors with 90+ CRI over a wide CCT range. Other LEDs having 80+ CRI implementations, or even 70+ CRI implementations (or even lower CRI values), may also be used in the embodiments described herein. These possibilities use LED circuits that realize, and increase or maximize, this potential. At the same time, the control circuits described herein are compatible with single-channel constant-current drivers to facilitate market adoption.

As light output of an LED is proportional to an amount of current used to drive the LED, dimming an LED can be achieved by, for example, reducing the forward current transferred to the LED. In addition to or instead of changing an amount of current used to drive each of a number of individual LEDs, a control unit (described in detail with reference to FIG. 4, below) or another type of multiplexer, switching apparatus, or similar apparatus, may rapidly switch selected ones of the LEDs between "on" and "off" states to achieve an appropriate level of dimming and color temperature for the selected lamp.

Generally, LED drive circuits are formed using either an analog-driver approach or a pulse-width modulation (PWM)-driver approach, or a hybrid combination of the two approaches. In an analog driver approach, all colors are driven simultaneously. Each LED is driven independently by providing a different current for each LED. The analog driver results in a color shift and currently there is not a way to shift current three ways. Analog driving often results in certain colors of LEDs being driven into low current mode and other times, into very high current mode. Such a wide dynamic range imposes a challenge on sensing and control hardware.

In a PWM driver, each color is switched on, in sequence, at high speed. Each color may be driven with substantially the same current. The mixed color is controlled by changing the duty cycle of each color. That is, one color can be driven for twice as long as another color to add into the mixed color. As human vision is unable to perceive very fast changing colors, the light emitted under such conditions appears to have one single color.

For example, a first LED (of a first color) is driven periodically with a current for a predetermined amount of time, then a second LED (of a second color) is driven periodically with the same current for a predetermined amount of time, and then a third LED (of a third color) is driven periodically with the same current for a predetermined amount of time. Each of the three predetermined amounts of time may be the same amount of time or different amounts of time. The mixed color is therefore controlled by changing the duty cycle of each color. For example, if a RGB LED is used and a specific output desired, red may be driven for a portion of the cycle, green for a different portion of the cycle, and blue is driven for yet another portion of the cycle based on the perception of the human eye. Instead of driving the red LED at a lower current, it may be driven at substantially the same current for a shorter time. This example demonstrates the downside of PWM with the LEDs being utilized poorly, therefore leading to an inefficient use of power. In some embodiments, the current is supplied from a voltage-controlled current source.

The desaturated RGB approach can further create tunable light on and off the BBL, as well as on the BBL, for example, an isothermal CCT line (as described below) while maintaining a high CRI. Various other systems, in comparison, may utilize a CCT approach where tunable color-points fall on a straight line between two primary colors of LEDs (e.g., R-G, R-B, or G-B).

FIG. 1 shows a portion of an International Commission on Illumination (CIE) color chart 100, including a black body line (BBL) 101 (also referred to as a Planckian locus) that forms a basis for understanding various embodiments of the subject matter disclosed herein. The BBL 101 shows the chromaticity coordinates for blackbody radiators of varying temperatures. It is generally agreed that, in most illumination situations, light sources should have chromaticity coordinates that lie on or near the BBL 101. Various mathematical procedures known in the art are used to determine the "closest" blackbody radiator. As noted above, this common lamp specification parameter is called the correlated color temperature (CCT). A useful and complementary way to further describe the chromaticity is provided by the $D_{uv}$ value, which is an indication of the degree to which a lamp's chromaticity coordinate lies above the BBL 101 (a positive $D_{uv}$ value) or below the BBL 101 (a negative $D_{uv}$ value).

The portion of the color chart is shown to include a number of isothermal lines 117. Even though each of these lines is not on the BBL 101, any color point on the isothermal line 117 has a constant CCT. For example, a first isothermal line 117A has a CCT of 10,000 K, a second isothermal line 117B has a CCT of 5,000 K, a third isothermal line 117C has a CCT of 3,000 K, and a fourth isothermal line 117D has a CCT of 2,200 K.

With continuing reference to FIG. 1, the CIE color chart 100 also shows a number of ellipses that represent a Macadam Ellipse (MAE) 103, which is centered on the BBL 101 and extends one step 105, three steps 107, five steps 109, or seven steps 111 in distance from the BBL 101. The MAE is based on psychometric studies and defines a region on the CIE chromaticity diagram that contains all colors which are indistinguishable, to a typical observer, from a color at the center of the ellipse. Therefore, each of the MAE steps 105 to 111 (one step to seven steps) are seen to a typical observer as being substantially the same color as a color at the center of a respective one of the MAEs 103. A series of curves, 115A, 115B, 115C, and 115D, represent substantially equal distances from the BBL 101 and are related to $D_{uv}$ values of, for example, +0.006, +0.003, 0, −0.003 and −0.006, respectively.

Figure 2A:
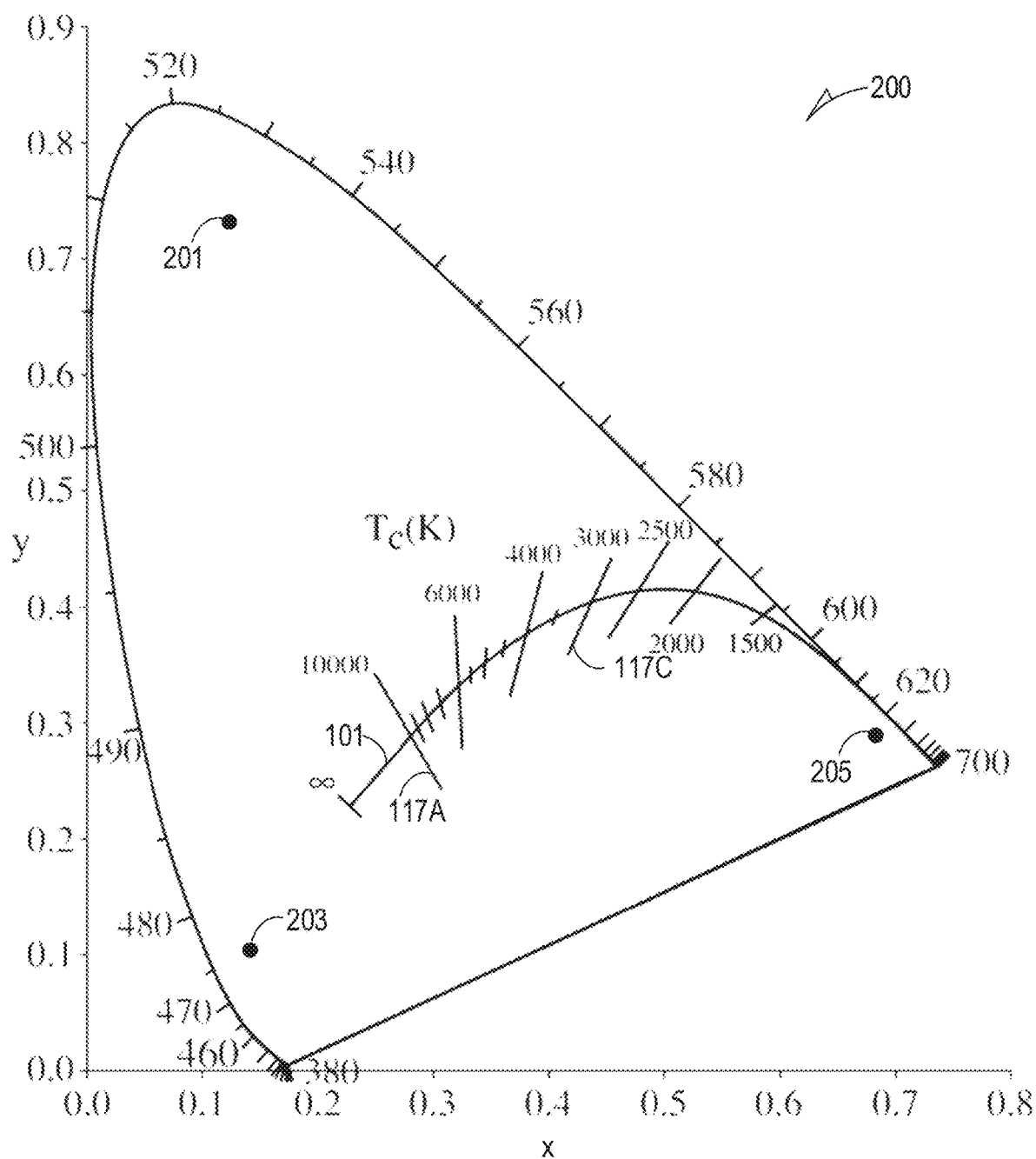
FIG. 2A shows a chromaticity diagram with approximate chromaticity coordinates of colors for typical red (R), green (G), and blue (B) LEDs, on the diagram, and including a BBL.

Referring now to FIG. 2A, and with continuing reference to FIG. 1, FIG. 2A shows a chromaticity diagram 200 with approximate chromaticity coordinates of colors for typical coordinate values (as noted on the x-y scale of the chromaticity diagram 200) for a red (R) LED at coordinate 205, a green (G) LED at coordinate 201, and a blue (B) LED at coordinate 203. FIG. 2A shows an example of the chromaticity diagram 200 for defining the wavelength spectrum of a visible light source, in accordance with some embodiments. The chromaticity diagram 200 of FIG. 2A is only one way of defining a wavelength spectrum of a visible light source; other suitable definitions are known in the art and can also be used with the various embodiments of the disclosed subject matter described herein.

A convenient way to specify a portion of the chromaticity diagram 200 is through a collection of equations in the x-y plane, where each equation has a locus of solutions that defines a line on the chromaticity diagram 200. The lines may intersect to specify a particular area, as described below in more detail with reference to FIG. 2B. As an alternative definition, the white light source can emit light that corresponds to light from a blackbody source operating at a given color temperature.

The chromaticity diagram 200 also shows the BBL 101 as described above with reference to FIG. 1. Each of the three LED coordinate locations 201, 203, 205 are the CCT coordinates for "fully-saturated" LEDs of the respective colors green, blue, and red. However, if a "white light" is created by combining certain proportions of the R, G, and B LEDs, the CRI of such a combination would be extremely low. Typically, in the environments described above, such as retail or hospitality settings, a CRI of about 90 or higher is desirable.

Figure 2B:
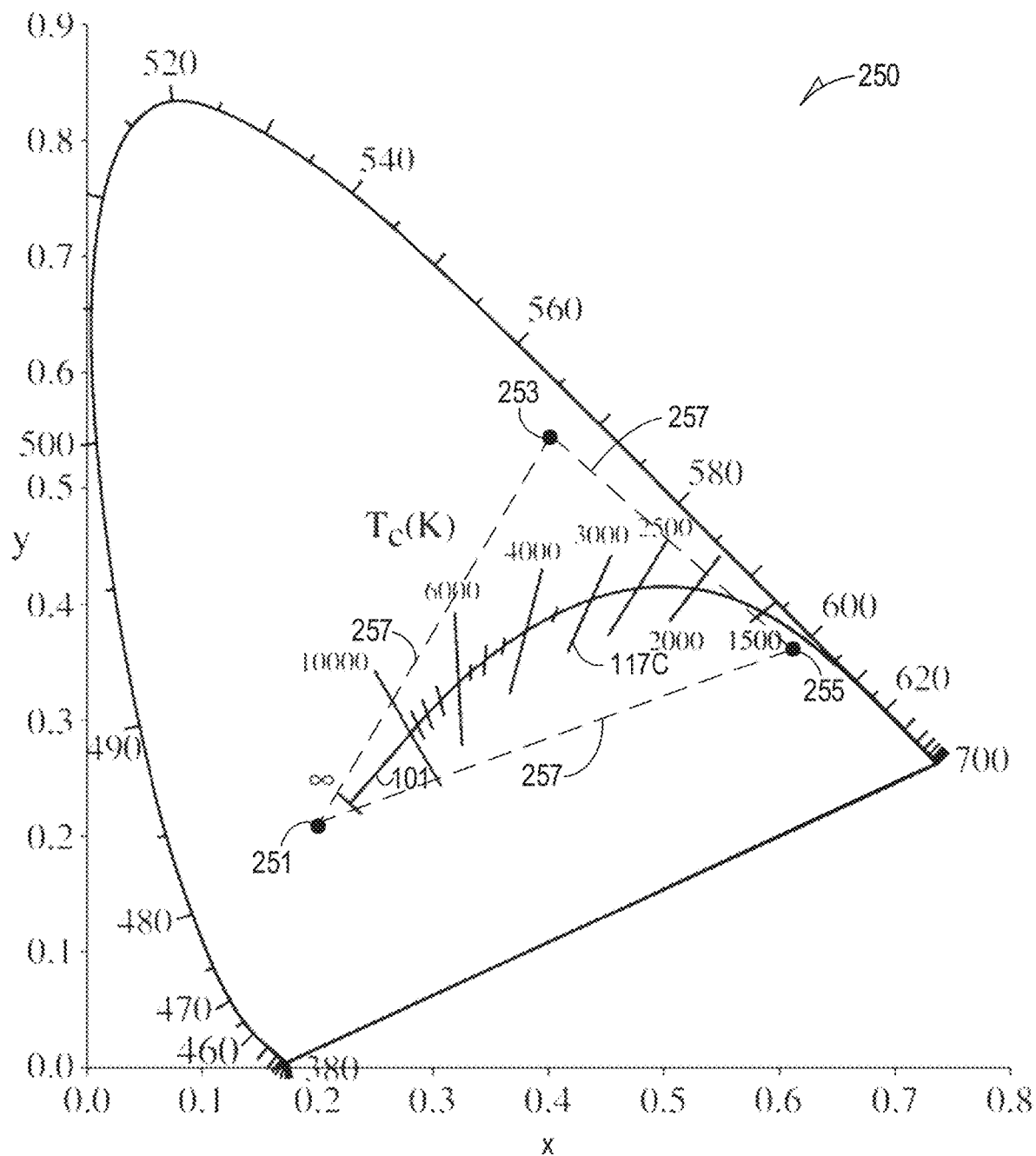
FIG. 2B shows a revised version of the chromaticity diagram of FIG. 2A, with approximate chromaticity coordinates for desaturated R, G, and B LEDs in proximity to the BBL, the desaturated R, G, and B LEDs having a color-rendering index (CRI) of approximately 90+ and within a defined color temperature range, in accordance with various embodiments of the disclosed subject matter.

FIG. 2B shows a revised version of the chromaticity diagram 200 of FIG. 2A, with approximate chromaticity coordinates for desaturated R, G, and B LEDs in proximity to the BBL, the desaturated R, G, and B LEDs having a color-rendering index (CRI) of approximately 90+ and within a defined color temperature range, in accordance with various embodiments of the disclosed subject matter.

However, the chromaticity diagram 250 of FIG. 2B shows approximate chromaticity coordinates for desaturated (pastel) R, G, and B LEDs in proximity to the BBL 101. Coordinate values (as noted on the x-y scale of the chromaticity diagram 250) are shown for a desaturated red (R) LED at coordinate 255, a desaturated green (G) LED at coordinate 253, and a desaturated blue (B) LED at coordinate 251. In various embodiments, a color temperature range of the desaturated R, G, and B LEDs may be in a range from about 1800 K to about 2500 K. In other embodiments, the desaturated R, G, and B LEDs may be in a color temperature range of, for example, about 2700 K to about 6500 K. In still other embodiments, the desaturated R, G, and B LEDs may be in a color temperature range of about 1800 K to about 7500 K. In still other embodiments, the desaturated R, G, and B LEDs may be selected to be in a wide range of color temperatures. As noted above, the color rendering index (CRI) of a light source does not indicate the apparent color of the light source; that information is given by the correlated color temperature (CCT). The CRI is therefore a quantitative measure of the ability of a light source to reveal the colors of various objects faithfully in comparison with an ideal or natural-light source.

In a specific exemplary embodiment, a triangle 257 formed between each of the coordinate values for the desaturated R, G, and B LEDs is also shown. The desaturated R, G, and B LEDs are formed (e.g., by a mixture of phosphors and/or a mixture of materials to form the LEDs as is known in the art) to have coordinate values in proximity to the BBL 101. Consequently, the coordinate locations of the respective desaturated R, G, and B LEDs, and as outlined by the triangle 257, has a CRI have approximately 90 or greater and an approximate tunable color-temperature-range of, for example, about 2700 K to about 6500 K. Therefore, the selection of a correlated color temperature (CCT) may be selected in the color-tuning application described herein such that all combinations of CCT selected all result in the lamp having a CRI of 90 or greater. Each of the desaturated R, G. and B LEDs may comprise a single LED or an array (or group) of LEDs, with each LED within the array or group having a desaturated color the same as or similar to the other LEDs within the array or group. A combination of the one or more desaturated R, G, and B LEDs comprises a lamp.

Figure 2C:
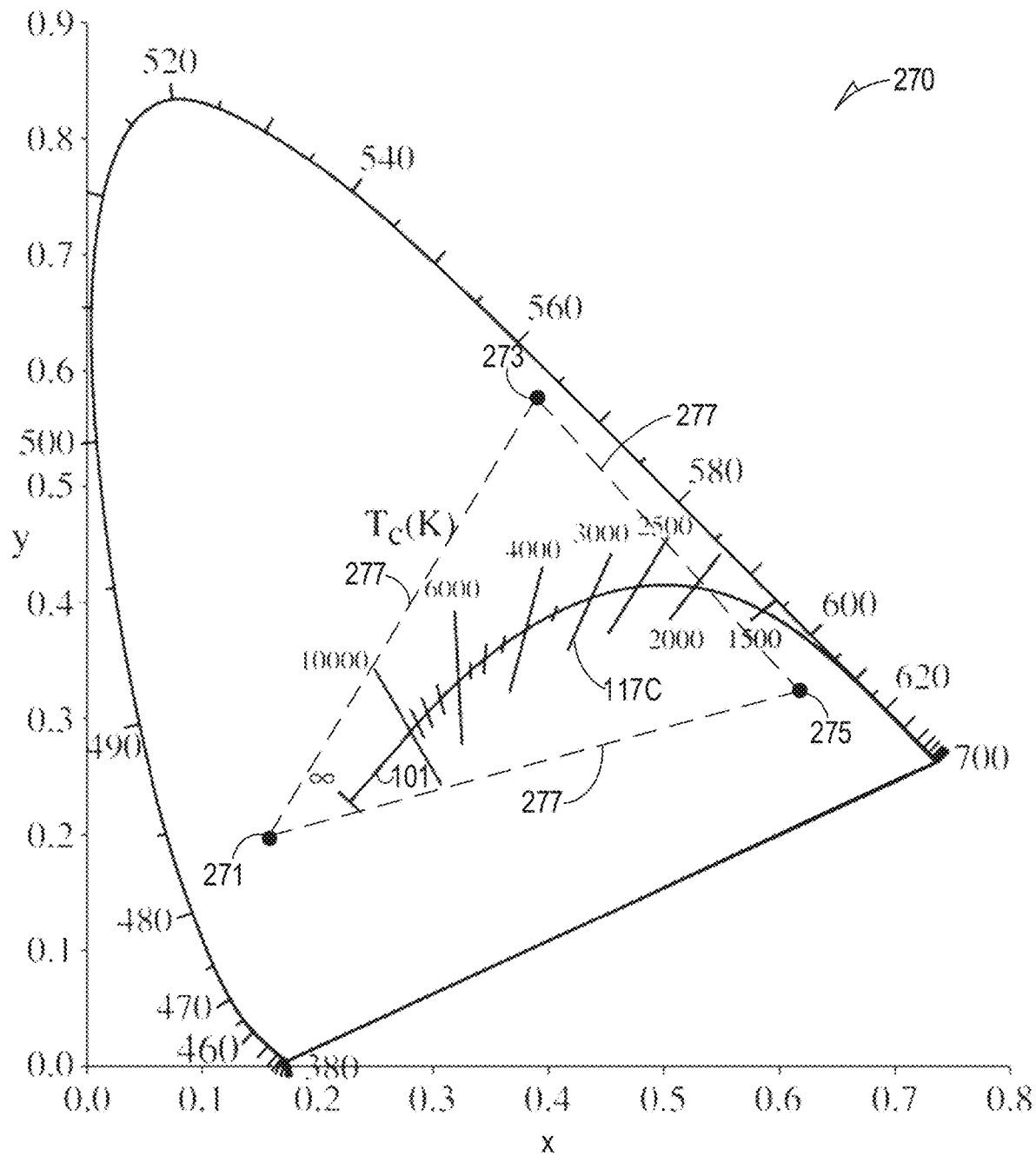
FIG. 2C shows a revised version of the chromaticity diagram of FIG. 2A, with approximate chromaticity coordinates for desaturated R, G, and B LEDs in proximity to the BBL, the desaturated R, G, and B LEDs having a color-rendering index (CRI) of approximately 80+ and within a defined color temperature range that is broader than the desaturated R, G, and B LEDs of FIG. 2B, in accordance with various embodiments of the disclosed subject matter.

FIG. 2C shows a revised version of the chromaticity diagram 200 of FIG. 2A, with approximate chromaticity coordinates for desaturated R, G. and B LEDs in proximity to the BBL, the desaturated R, G, and B LEDs having a color-rendering index (CRI) of approximately 80+ and within a defined color temperature range that is broader than the desaturated R, G, and B LEDs of FIG. 2B, in accordance with various embodiments of the disclosed subject matter.

However, the chromaticity diagram 270 of FIG. 2C shows approximate chromaticity coordinates for desaturated R, G, and B LEDs that are arranged farther from the BBL 101 than the desaturated R, G, and B LEDs of FIG. 2B. Coordinate values (as noted on the x-y scale of the chromaticity diagram 270) are shown for a desaturated red (R) LED at coordinate 275, a desaturated green (G) LED at coordinate 273, and a desaturated blue (B) LED at coordinate 271. In various embodiments, a color temperature range of the desaturated R, G, and B LEDs may be in a range from about 1800 K to about 2500 K. In other embodiments, the desaturated R, G, and B LEDs may be in a color temperature range of about 2700 K to about 6500 K. In still other embodiments, the desaturated R, G, and B LEDs may be in a color temperature range of about 1800 K to about 7500 K.

In a specific exemplary embodiment, a triangle 277 formed between each of the coordinate values for the desaturated R, G, and B LEDs is also shown. The desaturated R, G, and B LEDs are formed (e.g., by a mixture of phosphors and/or a mixture of materials to form the LEDs as is known in the art) to have coordinate values in proximity to the BBL 101. Consequently, the coordinate locations of the respective desaturated R, G, and B LEDs, and as outlined by the triangle 277, has a CRI have approximately 80 or greater and an approximate tunable color-temperature-range of, for example, about 1800 K to about 7500 K. Since the color temperature range is greater than the range shown in FIG. 2B, the CRI is commensurately decreased to about 80 or greater. However, a person of ordinary skill in the art will recognize that the desaturated R, G, and B LEDs may be produced to have individual color temperatures anywhere within the chromaticity diagram. Therefore, the selection of a correlated color temperature (CCT) may be selected in the color-tuning application described herein such that all combinations of CCT selected all result in the lamp having a CRI of 80 or greater. Each of the desaturated R, G, and B LEDs may comprise a single LED or an array (or group) of LEDs, with each LED within the array or group having a desaturated color the same as or similar to the other LEDs within the array or group. A combination of the one or more desaturated R, G, and B LEDs comprises a lamp.

Figure 3:
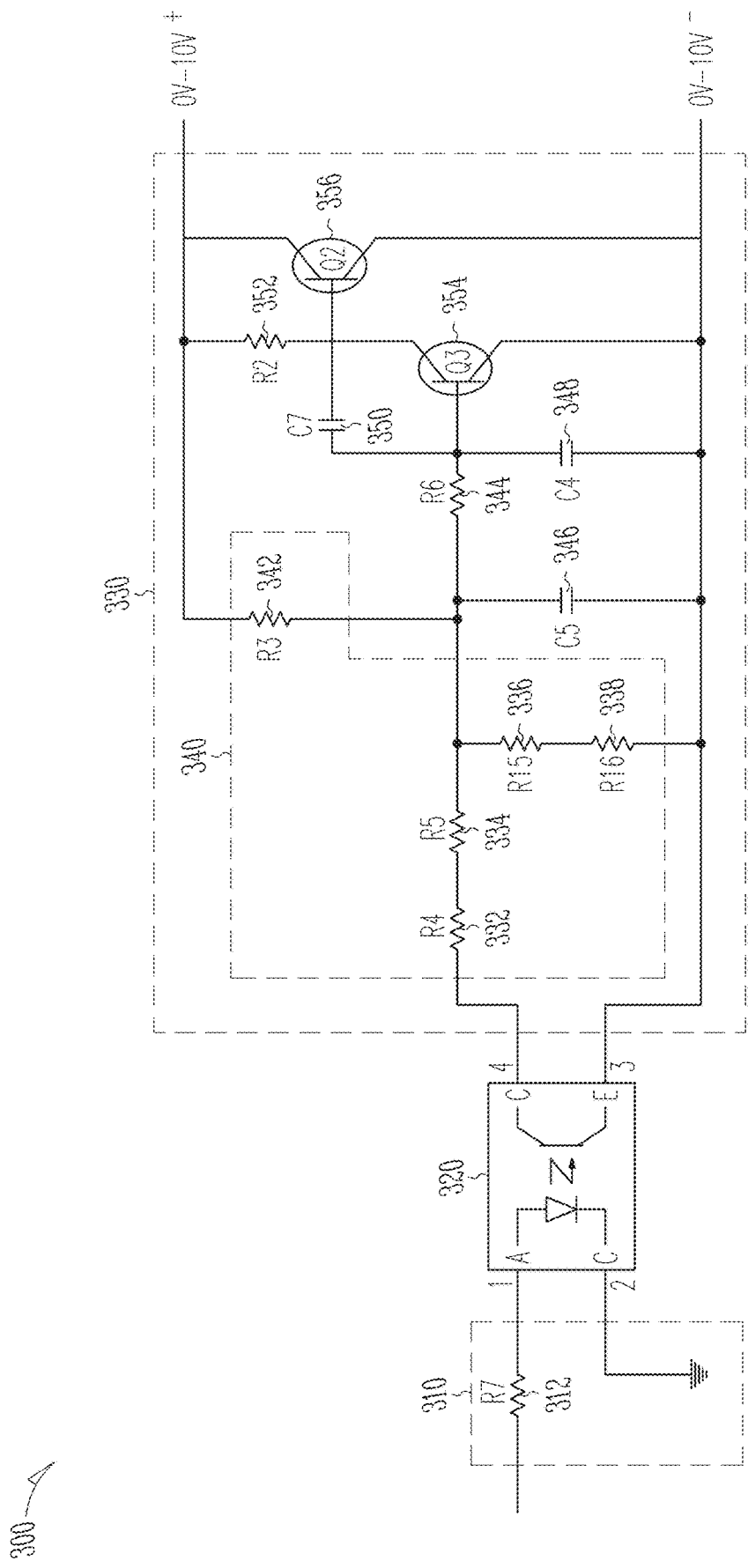
FIG. 3 shows an exemplary embodiment of a dimming emulator, in accordance with various embodiments of the disclosed subject matter.

FIG. 3 shows an exemplary embodiment of a dimming emulator, in accordance with various exemplary embodiments. The dimming emulator 300 may be used in a lighting system (e.g., such as a wireless color-tuning device 400 shown in FIG. 4, as described in more detail below). In this exemplary embodiment as shown in FIG. 3, the dimming emulator 300 is shown to include an input stage 310, a coupler 320, and an output stage 330. The dimming emulator 300 is configured to be compatible with existing (e.g., off the shelf) 0 to 10 V drivers. The dimming emulator 300 may be able to operate with a supply current as low as 150 μA while maintaining the same output voltage even if the supply current is increased to a few mA.

The input stage 310 includes a control input (or control input terminal) and ground. As described in more detail below, dimmer control signals are supplied to the control input. The dimmer control signals are used to control output voltages of the dimming emulator 300. The input stage 310 may have an input stage resistor 312 along the control input path between the control input and control output. In some embodiments, the input stage resistor 312 may have a resistance, such as 1 kΩ which is selected to limit current flow through the coupler 320.

In various embodiments, the coupler 320 may have two input terminals and two output terminals. The input terminals may include a control coupler input terminal (1) and a ground coupler terminal (2). The control coupler input terminal (1) may be coupled with the control output of the input stage 310. The ground coupler terminal (2) may be coupled with a common ground used to ground the LED array. The output terminals may include a low coupler output terminal (3) and a high coupler output terminal (4).

As shown, the coupler 320 may be an optical coupler that isolates the input stage 310 from the output stage 330. In this case, control signals supplied to the control coupler input terminal (1) may be supplied to a LED connected between the control coupler input terminal (1) and the ground coupler terminal (2). The light generated by the LED may be received by a photodiode connected between the low coupler output terminal (3) and high coupler output terminal (4), causing the connection between the low coupler output terminal (3) and high coupler output terminal (4) to be shorted when the LED is on and open circuited when the LED is off. This coupling condition accordingly varies the impedance of the coupler 320 seen by the output stage 330 and isolates the ground at the ground coupler terminal (2) and the voltage at the low coupler output terminal (3). Note that as the reaction speed of the coupler 320 may be relatively low, the PWM frequency may similarly be limited. For example, in some implementations, the PWM frequency has been empirically determined to be no more than 500 Hz in order to have a good duty cycle resolution (within a step size of about 1%).

The output stage 330 contains a control input coupled with the coupler output terminal (4) and a low supply voltage input coupled with the low coupler output terminal (3). The low supply voltage input is configured to provide a low supply voltage (e.g., 0 V-10 V$^-$) as an output of the output stage 330 at a 0 V-10 V$^-$ node of the dimming emulator 300. The control input is coupled with various circuit elements to provide a high supply voltage output (e.g., 0 V-10 V$^+$) as an output of the output stage 330 at a 0 V-10 V$^+$ node of the dimming emulator 300. When the dimmer control signals supplied to the input stage 310 are PWM signals (e.g., having a 5 V voltage swing), the impedance of the coupler 320 seen by the output stage 330 may be adjusted by controlling the duty cycle of the input PWM signals, leading to a varying output voltage appearing at the 0 V to 10 V$^+$ node.

As shown in FIG. 3, an exemplary voltage divider circuit 340 may be provided between the 0V-10 V$^+$ node and the 0 V-10 V$^-$ node. The voltage divider circuit 340 may include multiple voltage divider resistors 332, 334, 336, 338, 342 coupled with a control terminal of a transconductance device 354 through an input resistor 344. In some embodiments, the transconductance device 354 may be an NPN transistor and the control terminal may be the base of the transconductance device 354. In other embodiments, the transconductance device 354 may be a CMOS device. The collector of the transconductance device 354 may be connected to the 0 V-10 V$^+$ node through a collector resistor 352 and the emitter of the transconductance device 354 may be connected to the 0 V-10 V$^-$ node, as shown.

In particular, one or more resistors 342 may be connected between the 0-10 V$^+$ node and an intermediate node to which one end of the input resistor 344 is coupled (with the other end of the input resistor 344 coupled with the base of the transconductance device 354). A first set of the voltage divider resistors 336, 338 may be series connected between the intermediate node and the 0V-10V$^-$ node. A second set of the voltage divider resistors 332, 334 may be series connected between the intermediate node and the coupler output terminal (4) of the coupler 320. Thus, the first set of the voltage divider resistors 336, 338 may be connected in parallel with the second set of the voltage divider resistors 332, 334 and the coupler 320. As shown, voltage divider resistors and the second set of the voltage divider resistors 332, 334, 336, 338, 342, the output impedance of the coupler 320 and the transconductance device 354 form a V$_{be}$ multiplier. Changing the duty cycle of the PWM signal changes the average impedance of the coupler 320 and thereby changes the ratio of the V$_{be}$ multiplier, which in turn determines the output voltage at the 0-10V$^+$ node.

Thus, when the dimmer control signals supplied to the input stage 310 are PWM signals and the duty cycle is 0%, the coupler 320 essentially provides an open circuit. Accordingly, the branch of the voltage divider circuit 340 that includes the output impedance of the coupler 320 and the second set of the voltage divider resistors 332, 334 is open-circuited. Thus, the voltage divider circuit 340 provides a voltage at the intermediate node of:

$$(0 - 10\ V^-) + ((0 - 10\ V^+) - (0 - 10\ V^-)) * \frac{(R_{336} + R_{338})}{(R_{336} + R_{338} + R_{342})}.$$

When the dimmer control signals supplied to the input stage 310 are PWM signals and the duty cycle is 100% (essentially shorting the output of the coupler 320), on the other hand, the total impedance may be the output impedance of the coupler 320 (Re) in series with the second set of the voltage divider resistors 332, 334, and in parallel with the sum of the first set of the voltage divider resistors 336, 338. Thus, the voltage divider circuit 340 provides a voltage at the intermediate node of:

$$(0 - 10\ V^-) + ((0 - 10\ V^+) - (0 - 10\ V^-)) * \frac{(R_{332} + R_{334} + R_c) * \frac{(R_{336} + R_{338})}{(R_{332} + R_{334} + R_c) + (R_{336} + R_{338})}}{\left(\frac{(R_{332} + R_{334} + R_c) * (R_{336} + R_{338})}{(R_{332} + R_{334} + R_c) + (R_{336} + R_{338})} + R_{342}\right)}.$$

In one specific example, values of the voltage divider resistors 332, 338, 342, may respectively be 2.2 kΩ, 130 kΩ, 91 kΩ, although these values are not exclusive. The V$_{be}$ of the transconductance device 354 may have a negative temperature dependency of roughly −2 mV/C° and thus the output voltage of the 0V-10V$^+$ node may have a temperature dependency. In order to compensate for this dependency, additional voltage divider resistors (voltage divider resistors 334, 336) may be negative temperature coefficient (NTC) resistors. The resistances and B-values of the voltage divider resistors 334, 336 may be empirically determined by circuit simulation and testing. Note that the compensation provided by the voltage divider resistors 334, 336 may not completely eliminate temperature dependency as the V$_b$c temperature coefficient depends on multiple factors and may not be constant over the entire range of base voltages.

In addition to the voltage divider resistors 332, 334, 336, 338, 342 coupled with the base of the transconductance device 354, capacitors 346, 348, 350 may also be coupled with the base of the transconductance device 354. In particular, decoupling capacitor 346 may be disposed between the intermediate node and the 0-10V$^+$ node and decoupling capacitor 348 may be disposed between the base of the transconductance device 354 and the 0-10V$^+$ node. Thus, the decoupling capacitors 346, 348 may be disposed on opposing sides of the input resistor 344. The decoupling capacitors 346, 348 may be used with the input resistor 344 as a lowpass filter to filter out the switching noise of the coupler 320 and the transconductance device 354. The base-collector capacitor 350 is disposed between the base and the collector of the transconductance device 354 to provide circuit stability.

In embodiments, the transconductance device 354 sinks at least 150 µA and may sink much more current (e.g., 1 mA), dependent on the number of LED arrays being powered by the driver or number of drivers coupled with the transconductance device 354. To sink current in order to maintain the voltage at the 0-10V$^+$ node, an additional transconductance device may be coupled with the transconductance device 354. Specifically, as shown, the base of a PNP transistor 356 may be coupled to the collector of the transconductance device 354 (in addition to the end of the base-collector capacitor 350 coupled to the collector of the transconductance device 354 and the end of the collector resistor 352 coupled to the collector of the transconductance device 354). As shown, the emitter of the PNP transistor 356 may be coupled to the 0-10V$^+$ node and the collector of the PNP transistor 356 may be coupled to the 0-10V$^-$ node. Examples of values of the capacitors 346, 348, 350 are 2.2 µF, 2.2 µF, and 100 nF, respectively.

The arrangement shown in FIG. 3 permits the dimming emulator 300 to control one or more LED drivers at the same time. When multiple LED drivers are connected to the dimming emulator 300, the dimming emulator 300 should be able to sink the sum of all the currents and still maintain a relatively stable output voltage. On the other hand, the dimming emulator 300 should also be able to operate reliably from just one LED driver. In electrical terms, the dimming emulator 300 should behave as a variable constant-voltage regulator regardless of its input current. The output voltage is generally determined by its control input only (e.g., usually the position of a slider or wireless control signal).

Although not shown, in some embodiments other circuit elements may be present. For example, additional resistors and/or diodes may be used in the branches of the voltage divider circuit 340, an overcurrent-protection device may be provided to limit current flowing through the transconductance device 354. In some embodiments, one or both of the NTC voltage divider resistors 334, 336 in the voltage divider circuit 340 may be eliminated. One or more of the various resistors may be fixed or may be adjustable reference.

In some embodiments, a coupler other than an optical coupler may be used. For example, a transformer may be used, with the corresponding circuitry in the output stage 330 adjusted. A transformer, however, may be bulkier and more expensive than an optical coupler. Alternatively, a digital circuit (e.g., integrated circuit) and RC circuit may be used to provide at least a minimum current to drive the LED arrays.

Figure 4:
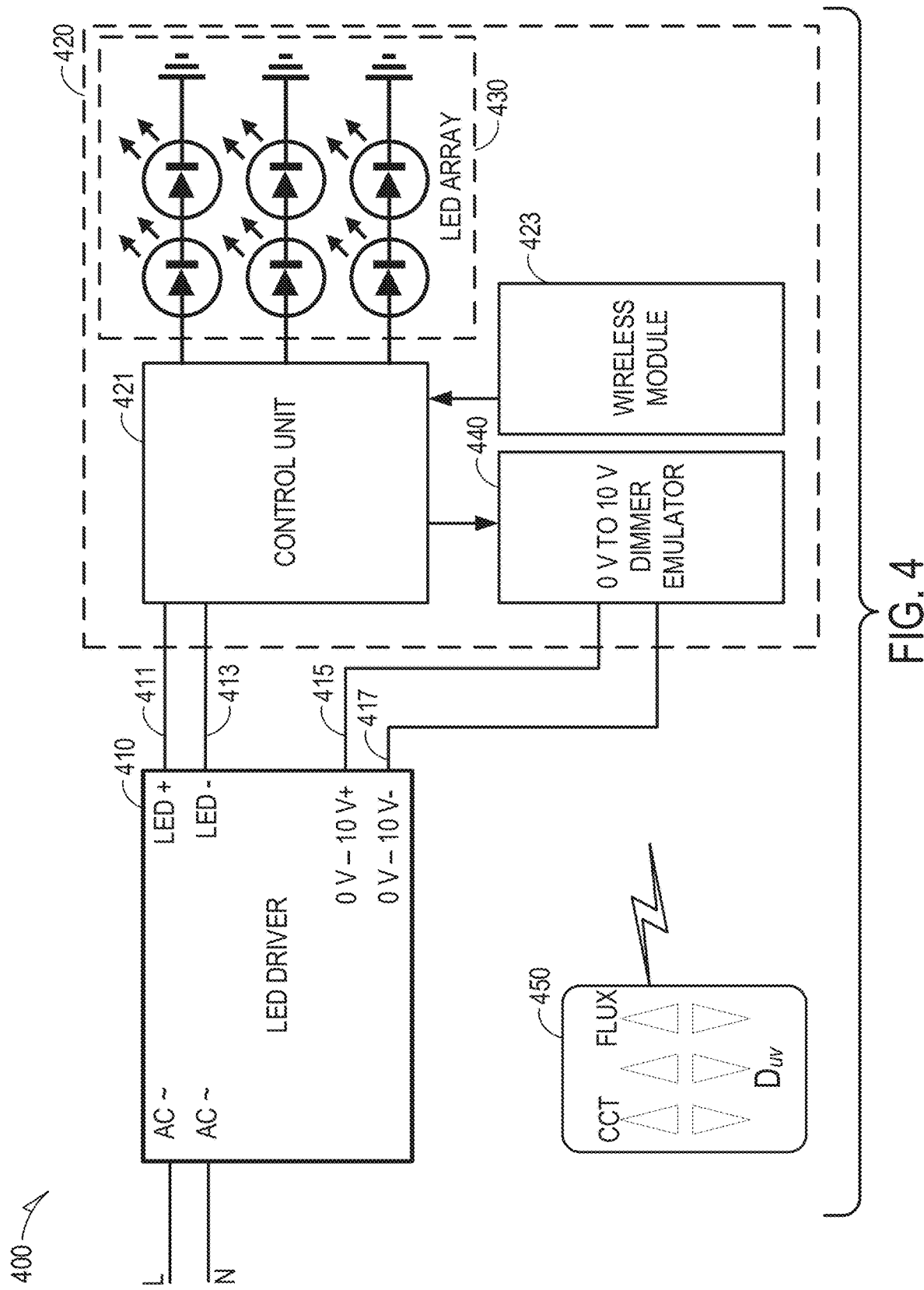
FIG. 4 shows an example of a high-level schematic diagram of a wireless color-tuning device, a controller unit, a dimming emulator, a wireless module, and an LED array comprising, for example, the desaturated LEDs of FIGS. 2B and 2C, in accordance with various embodiments of the disclosed subject matter.

FIG. 4 shows an example of a high-level schematic diagram of a wireless color-tuning device 400, including a control unit 421, a dimming emulator 440, a wireless control-device 450, a wireless module 423, and an LED array 430. The LED array 430 may comprise, for example, the desaturated LEDs of FIGS. 2B and 2C, in accordance with various embodiments of the disclosed subject matter.

The dimming emulator 440 may be the same or similar to the dimming emulator 300 as described in detail with reference to FIG. 3, above. However, in various embodiments, the dimming emulator 440 can perform many operations consecutively. Such operations can include, for example, receiving and processing signals of at least one of CCT, $D_{uv}$, and luminous flux. In some embodiments in which the dimming emulator 440 performs multiple operations substantially concurrently, the dimming emulator 440 may be instantiated multiple times to control various operations of the LED array 430. If the wireless color-tuning device 400 is configured only to control luminous flux, a person of ordinary skill in the art may consider the wireless color-tuning device 400 to be a wireless LED-control device.

In some embodiments, each of the control unit 421, the dimming emulator 440, the wireless module 423, and the LED array 430 may be contained within a light-engine (enclosure) 420. In some embodiments, one or more of the control unit 421, the dimming emulator 440, the wireless module 423, and/or the LED array 430 may be physically located within the light-engine enclosure 420 and others of the control unit 421, the dimming emulator 440, the wireless module 423, and/or the LED array 430 may be located outside of the light-engine enclosure 420 either nearby (e.g., within a few meters) or more remotely (e.g., dozens of meters) from each other. As is instantly recognizable to a person of ordinary skill in the art, all physical control-devices that are hard-wired (e.g., dimmers) are eliminated.

The wireless color-tuning device 400 includes a single-channel driver circuit (e.g., LED driver 410). In some embodiments, the LED driver 410 may be located within a customer installation-area. In some embodiments, the LED driver 410 may be located remotely from a customer installation-area (but generally still within a customer facility). In some embodiments, the LED driver 410 may be located within the light-engine enclosure 420 (e.g., a junction box or other type of electronics enclosure used for housing various types of electrical or electronic components).

As is known to a person of ordinary skill in the art, since light output of an LED is proportional to an amount of current used to drive the LED, dimming an LED can be achieved by, for example, reducing the forward current transferred to the LED. The LED driver 410 sends a predetermined amount of current to one, two, or all three colors of the LED array 430 to change an overall CCT and/or $D_{uv}$ level of the LED array 430.

However, in addition to or instead of changing an amount of current used to drive each of individual ones of the LEDs in the LED array 430, a control unit (described below with reference to FIG. 5) may rapidly switch selected ones of the LEDs or selected groups of colors in the LED array 430 between "on" and "off" states to achieve an appropriate level of dimming for the selected lamp in accordance with intensities desired as indicated by an end-user in setting a level of desired brightness on, for example, a flux-control device.

The LED driver 410 is coupled through an LED+ signal line 411 and an LED− signal line 413 provide power to the LED array 430, through the control unit 421. The control unit 421 may be, for example, a microcontroller, a microprocessor, or other processing unit known in the art. In some embodiments, the control unit 421 may be, for example, a special-purpose processor, such as a field-programmable gate array (FPGA) or an application specific integrated circuit (ASIC). The control unit 421 is configured to control the LED array 430, which is coupled to the control unit 421. For example, the control unit 421 receives wireless-based signals from the wireless module 423 to control various operations and lighting modes of the LED array 430. As discussed above, the control operations may include, for example, a received signal to adjust luminous flux, CCT, and/or $D_{uv}$ distance from the BBL (for example, along an isothermal line of the received CCT—see FIG. 1). The LED array 430 can be any type of multi-colored LED array including the desaturated-types of LEDs described above with reference to FIGS. 2B and 2C.

Signals received from the wireless module 423 are interpreted or translated by an algorithm within the control unit 421. The interpretation or translation provides a determination how the received wireless-signals affect operations of the LED array 430. For example, the control unit 421 may relate a specific signal amplitude and signal type (e.g., a series and periodicity of the received signals) to a particular operation of the LED arrays 430. The particular types of operations can include at least one of CCT, $D_{uv}$, and/or luminous flux.

In some embodiments, the determination of how the received wireless-signals affect operations of the LED array 430 is made by comparing the received signal to a lookup table (LUT) stored, for example, within the control unit 421 to a particular CCT, $D_{uv}$, and/or luminous flux setting of one or more groups of individual colors of LEDs within the LED array 430. In various embodiments, a translation mechanism of the control unit 421 includes both the algorithm embodiment and the LUT embodiment that may be used concurrently to translate various components of the received signal.

Further, although not shown explicitly, the control unit 421 may control switching operations of individual LEDs or groups of a single LED color within the LED array 430. For example, the control unit can provide a PWM signal, based on the signal received from the wireless module 423, to provide user-selected CCT, Du, and/or luminous flux to the LED array 430 by switching selected colors or color groups of LEDs within the LED array 430.

In various embodiments, at least one of the LED driver 410 (see FIG. 4) and the control unit 421 may comprise or include a hybrid LED driving-circuit for CCT and $D_{uv}$ tuning, as well as for luminous-flus control. The hybrid driving-circuit can include an LED driver to produce a stabilized LED-driver current. In a specific exemplary embodiment, the control unit 421 delivers the current to the appropriate ones of LEDs or color groups of LEDs within the LED array 430 based on, for example, the desired CCT and $D_{uv}$ tuning. The hybrid driving-circuit within the control unit 421 may then be overlaid with PWM time-slicing directing current to at least two colors of the LED array 430.

In various embodiments, the control unit 421 can be configured to have a special calibration mode. The calibration mode can function with either the algorithm (although the user may need access to the underlying software or firmware to change values) or values in the LUT. For example, the control unit 421 can enter the calibration mode if it is power cycled in a special sequence (e.g., a combination of long and short power-up/down cycles). While in this calibration mode, the user (e.g., a calibrating technician at the factory or an advanced end-user) is asked to change the correlation values of the output signals of the three control devices to their respective controlled-values (CCT, $D_{uv}$, and/or flux). The control unit 421 then stores these two algorithms or values in, for example, software in an internal memory or firmware (e.g., an EEPROM), or hardware (e.g., a Field Programmable Gate Array (FPGA)). The internal memory can take a number of forms including, for example, electrically erasable programmable read-only memory (EEPROM), phase-change memory (PCM), flash memory, or various other types of non-volatile memory devices known in the art.

With continuing reference to FIG. 4, the wireless module 423 provides signals, received wirelessly, to the control unit 421. The wireless module 423 can be of any type of open-source standard or proprietary standard. In various embodiments, the wireless module 423 is configured to provide signals to the control unit 421 via pre-defined protocols (some of which are described below). In some embodiments, it may be desirable for the wireless module 423 to have a low-power consumption if it is powered from the LED current. In case the wireless module 423 operates in bursts of high-peak current, a large decoupling capacitor (described below with reference to FIG. 5) may be used to reduce voltage/current (power) dips in power supplied to the LED (e.g., voltage and/or current), thereby eliminating or reducing light flicker from the LED array 430.

The wireless module 423 may be configured to receive signals and to communicate in pre-defined protocols, known in the art, with the control unit 421 over, for example, a serial interface. In a specific exemplary embodiment, the wireless module 423 uses a universal asynchronous receiver-transmitter (UART) communications protocol. In other embodiments, the wireless module 423 may use a inter-integrated circuit (I-squared-C or $I^2C$) protocol, a Serial Peripheral Interface (SPI), or other type of communications protocol known in the art. The wireless signals may be transferred from the wireless control-device 450 at a remote location to the wireless color-tuning device 400 via Wi-Fi®, Bluetooth®, Zigbee®, Z-Wave®, fifth-generation cellular-network technology (5G), or other communication technology-signals known in the art.

Further, although the wireless control-device 450 is shown to include buttons to either increase or decrease each of CCT, $D_{uv}$, and luminous flux, only one or two of the sets of buttons may be included in an actual wireless device. For example, in some embodiments, the wireless control-device 450 may only include a single set of buttons to increase or decrease CCT. In other embodiments, the wireless control-device 450 may only include two sets of buttons to increase or decrease both CCT and luminous flux. In still other embodiments, the wireless control-device 450 may include only a single "increase and decrease" set of buttons with a selector switch to determine which one of, for example, CCT, $D_{uv}$, and luminous flux relates to the increase and decrease set of buttons. The programming of such signals emanating from the wireless control-device 450 for a given communications protocol is known in the art.

The wireless control-device 450 may comprise an electrical control-device, a mechanical control-device, or a software control-device, each of which is configured to transmit a signal (e.g., indicative of end-user preferences for CCT, $D_{uv}$, and/or luminous flux (an intensity level of the LED array 430)) to the wireless module 423 of FIG. 4. The wireless control-device 450 may be based on analog or digital signals. If the wireless control-device is based on an analog output, one of the components within the light-engine enclosure 420, such as, for example, the wireless module 423 or the control unit 421, can include an analog-to-digital converter (ADC).

The dimming emulator 440 receives instructions from the control unit 421 to provide signals on a 0 V to 10 V⁺ signal line 415 and a 0 V to 10 V⁺ signal line 417 to an input of the LED driver 410. The dimming emulator is described in more detail with reference to FIG. 5, below.

In various embodiments, the dimming emulator 440 is not powered by current supplied by the LED driver 410 to the LED array 430. In these embodiments, the power for the dimming emulator 440 may be supplied by the 0 V to 10 V interface of the LED driver 410. Most commercially-available LED 0 V to 10 V interfaces provides a unit current from between about 150 μA and about 200 μA. In other embodiments, a separate power supply may be installed near the dimming emulator 440 (e.g., within the light-engine enclosure 420).

In some embodiments, various ones of the various components and modules described above may comprise software-based modules (e.g., code stored or otherwise embodied in a machine-readable medium or in a transmission medium), hardware modules, or any suitable combination thereof. A hardware module is a tangible (e.g., non-transitory) physical component (e.g., a set of one or more microcontrollers or microprocessors or other hardware-based devices) capable of performing certain operations and interpreting the output signals received from, for example, the wireless module 423 of FIG. 4. The one or more modules may be configured or arranged in a certain physical manner. In various embodiments, one or more microcontrollers or microprocessors, or one or more hardware modules thereof, may be configured by software (e.g., through an application or portion thereof) as a hardware module that operates to perform operations described herein for that module.

In some example embodiments, a hardware module may be implemented, for example, mechanically or electronically, or by any suitable combination thereof. For example, a hardware module may include dedicated circuitry or logic that is permanently configured to perform certain operations. A hardware module may be or include a special-purpose processor, such as a field-programmable gate array (FPGA) or an application specific integrated circuit (ASIC). A hardware module may also include programmable logic or circuitry that is temporarily configured by software to perform certain operations. As an example, a hardware module may include software encompassed within a central processing unit (CPU) or other programmable processor. It will be appreciated that a decision to implement a hardware module mechanically, electrically, in dedicated and permanently configured circuitry, or in temporarily configured circuitry (e.g., configured by software) may be driven by cost and time considerations.

In various embodiments, many of the components described may comprise one or more modules configured to implement the functions disclosed herein. In some embodiments, the modules may constitute software modules (e.g., code stored on or otherwise embodied in a machine-readable medium or in a transmission medium), hardware modules, or any suitable combination thereof. A "hardware module" is a tangible (e.g., non-transitory) physical component (e.g., a set of one or more microprocessors or other hardware-based devices) capable of performing certain operations and interpreting certain signals. The one or more modules may be configured or arranged in a certain physical manner. In various embodiments, one or more microprocessors or one or more hardware modules thereof may be configured by software (e.g., an application or portion thereof) as a hardware module that operates to perform operations described herein for that module.

In some example embodiments, a hardware module may be implemented, for example, mechanically or electronically, or by any suitable combination thereof. For example, a hardware module may include dedicated circuitry or logic that is permanently configured to perform certain operations. As noted above, a hardware module may comprise or include a special-purpose processor, such as an FPGA or an ASIC. A hardware module may also include programmable logic or circuitry that is temporarily configured by software to perform certain operations, such as interpretation of the various signals received by the control unit 421 from the wireless module 423 (see FIG. 4).

The description above includes illustrative examples, devices, systems, and methods that embody the disclosed subject matter. In the description, for purposes of explanation, numerous specific details were set forth in order to provide an understanding of various embodiments of the disclosed subject matter. It will be evident, however, to those of ordinary skill in the art that various embodiments of the subject matter may be practiced without these specific details. Further, well-known structures, materials, and techniques have not been shown in detail, so as not to obscure the various illustrated embodiments.

As used herein, the term "or" may be construed in an inclusive or exclusive sense. Further, other embodiments will be understood by a person of ordinary skill in the art upon reading and understanding the disclosure provided. Further, upon reading and understanding the disclosure provided herein, the person of ordinary skill in the art will readily understand that various combinations of the techniques and examples provided herein may all be applied in various combinations.

Although various embodiments are discussed separately, these separate embodiments are not intended to be considered as independent techniques or designs. As indicated above, each of the various portions may be inter-related and each may be used separately or in combination with other types of electrical control-devices, such as dimmers and related devices. Consequently, although various embodiments of methods, operations, and processes have been described, these methods, operations, and processes may be used either separately or in various combinations.

Consequently, many modifications and variations can be made, as will be apparent to a person of ordinary skill in the art upon reading and understanding the disclosure provided herein. Functionally equivalent methods and devices within the scope of the disclosure, in addition to those enumerated herein, will be apparent to the skilled artisan from the foregoing descriptions. Portions and features of some embodiments may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A dimming emulator comprising:
an input stage having a control input, the input stage coupled with a control unit to receive control signals from the control unit at the control input, the input stage configured to share ground with the control unit;
an output stage coupled with a light-emitting diode (LED) driver to provide a high supply voltage and a low supply voltage to the LED driver in response to the control signals received at the input stage to permit the LED driver to provide a high LED voltage and a low LED voltage to LED arrays; and
a coupler configured to isolate the low supply voltage from ground and the control signals from the high supply voltage and provide a controllable impedance to adjust the high supply voltage,
the output stage comprising a voltage divider that includes:
a first resistor coupled with a first output terminal of the coupler;
a second resistor disposed between the first resistor and a second output terminal of the coupler, the second output terminal of the coupler configured to provide the low supply voltage to the LED driver via a low output terminal of the output stage; and
a third resistor between a high output terminal of the output stage and a center node between the first resistor and the second resistor.

2. The dimming emulator of claim 1, wherein the coupler is an optical coupler.

3. The dimming emulator of claim 1, wherein the control signals are control pulse-width modulation (PWM) signals, and the high supply voltage is dependent on a duty cycle of the control PWM signals by control of the impedance.

4. The dimming emulator of claim 1, wherein the output stage further comprises a transconductance device having:
a control terminal coupled with the center node;
a first terminal configured to provide the high supply voltage as an amplified voltage of a voltage supplied to the control terminal at a high output terminal of the output stage; and
a second terminal coupled with the low output terminal of the output stage.

5. The dimming emulator of claim 4, wherein the transconductance device is a bipolar junction transistor.

6. The dimming emulator of claim 4, wherein:
the transconductance device has a negative temperature dependency; and
the output stage further comprises:
a first negative temperature coefficient (NTC) resistor between the first output terminal of the coupler and the control terminal of the transconductance device; and a second NTC resistor between the first resistor and the second output terminal of the coupler, the first NTC resistor and the second NTC resistor having resistances and B-values selected to compensate for the negative temperature dependency of the transconductance device.

7. The dimming emulator of claim 4, wherein the output stage further comprises:
a fourth resistor between the center node and the control terminal of the transconductance device;
an output capacitor between the control terminal and the first terminal of the transconductance device;
a first input capacitor between the center node and the low output terminal of the output stage, the first input capacitor in parallel with the second resistor; and
a second input capacitor between the control terminal of the transconductance device and the low output terminal of the output stage, the first input capacitor and the second input capacitor configured to filter switching noise of the coupler.

8. The dimming emulator of claim 7, wherein the output stage further comprises:
a fifth resistor between the first terminal of the transconductance device and the high output terminal of the output stage at an output node of the transconductance device, the output capacitor coupled to the output node of the transconductance device; and
another transconductance device having:
a control terminal coupled with the output node of the transconductance device;
a first terminal coupled with the high output terminal of the output stage; and
a second terminal coupled with the low output terminal of the output stage.

9. The dimming emulator of claim 8, wherein:
the transconductance device is an npn transistor, the first terminal of the transconductance device being a collector and the second terminal of the transconductance device being an emitter; and
the other transconductance device is a pnp transistor, the first terminal of the transconductance device being an emitter and the second terminal of the transconductance device being a collector.

10. A light engine, comprising:
a light-emitting diode (LED) array comprising LEDs of different colors;
a dimming emulator:
configured to supply a high supply voltage and low supply voltage to an LED driver in response to control signals;
a coupler configured to isolate the low supply voltage from ground of the dimming emulator; and
a control unit configured to:
provide the control signals to the dimming emulator; and
receive power for the LED array from the LED driver dependent on the high supply voltage and low supply voltage provided to the LED driver from the dimming emulator and control the LED array based thereon,
the dimming emulator comprising a voltage divider that includes:
a transconductance device having a control terminal and configured to provide the high supply voltage as an amplified voltage of a voltage supplied to the control terminal;
a first resistor between a first output terminal of the coupler and the control terminal of the transconductance device;
a second resistor disposed between the control terminal of the transconductance device and a second output terminal of the coupler, the second output terminal of the coupler configured to provide the low supply voltage to the LED driver via a low output terminal of the dimming emulator; and
a third resistor between a high output terminal of the dimming emulator and the control terminal of the transconductance device.

11. The light engine of claim 10, wherein the dimming emulator further comprises:
a first negative temperature coefficient (NTC) resistor between the first output terminal of the coupler and the control terminal of the transconductance device; and
a second NTC resistor between the control terminal of the transconductance device and the second output terminal of the coupler, the first NTC resistor and the second NTC resistor having resistances and B-values selected to compensate for a negative temperature dependency of the transconductance device.

12. The light engine of claim 10, wherein the dimming emulator further comprises:
a fourth resistor between the control terminal of the transconductance device and a center node between the first resistor, the second resistor, and the third resistor;
an output capacitor between the control terminal and a first terminal of the transconductance device coupled with the high output terminal of the dimming emulator through a fifth resistor;
a first input capacitor between the center node and the low output terminal of the dimming emulator, the first input capacitor in parallel with the second resistor; and
a second input capacitor between the control terminal of the transconductance device and the low output terminal of the dimming emulator, the first input capacitor and the second input capacitor configured to filter switching noise of the coupler.

13. The light engine of claim 12, wherein:
the transconductance device is an npn transistor, the first terminal of the transconductance device being a collector and the second terminal of the transconductance device being an emitter; and
the dimming emulator further comprises a pnp transistor having:
a control terminal coupled with the collector of the npn transistor;
an emitter coupled with the high output terminal of the dimming emulator; and
a collector coupled with the low output terminal of the dimming emulator.

14. The light engine of claim 10, wherein the control signals are control pulse-width modulation (PWM) signals, and the high supply voltage is dependent on a duty cycle of the control PWM signals.

15. The light engine of claim 10, further comprising a wireless module to receive wireless signals from a wireless control-device, the wireless signals comprising a correlated color temperature (CCT) value and a distance value ($D_{uv}$) of a temperature of the LED array from a black-body line (BBL), the control unit configured to translate the wireless signals and to provide the control signals to the dimming emulator based on the translated wireless signals.

16. A method of driving a multi-color light-emitting diode (LED) array, the method comprising:

receiving wireless signals from a wireless control-device, the wireless signals comprising a correlated color temperature (CCT) value and a distance value ($D_{uv}$) of a temperature of the LED array from a black-body line (BBL);

translating the wireless signals into pulse-width modulation (PWM) control signals;

providing PWM control signals to a dimming emulator based on the translated wireless signals;

determining, at the dimming emulator:
  a high supply voltage dependent on a duty cycle of the control PWM signals, and
  a low supply voltage;

isolating, in the dimming emulator, the low supply voltage from a ground of the dimming emulator using an optical coupler;

supplying the high supply voltage and the low supply voltage to an LED driver; and receiving power for the LED array from the LED driver, the power dependent on the high supply voltage and low supply voltage and controlling the LED array based on the power received from the LED driver.

17. The method of claim 16, further comprising:

amplifying the PWM control signals to provide the high supply voltage; and changing an average impedance of the optical coupler based on the duty cycle to change a ratio of a multiplier used during amplification of the PWM control signals.

18. The method of claim 17, further comprising:

compensating for a negative temperature dependency of a bipolar junction transistor used for amplifying the PWM control signals using a first negative temperature coefficient (NTC) resistor between the optical coupler and a control terminal of the bipolar junction transistor and a second NTC resistor between the control terminal of the bipolar junction transistor and the low supply voltage.

* * * * *